(12) United States Patent
Qawami et al.

(10) Patent No.: US 8,751,317 B2
(45) Date of Patent: Jun. 10, 2014

(54) ENABLING A MERCHANT'S STOREFRONT POS (POINT OF SALE) SYSTEM TO ACCEPT A PAYMENT TRANSACTION VERIFIED BY SMS MESSAGING WITH BUYER'S MOBILE PHONE

(75) Inventors: Bahman Qawami, San Jose, CA (US); Branimir Z. Talaich, Saratoga, CA (US); Matthew J. Farrell, San Jose, CA (US)

(73) Assignee: Koin, Inc., San Jose, CA (US)

( * ) Notice: Subject to any disclaimer, the term of this patent is extended or adjusted under 35 U.S.C. 154(b) by 0 days.

(21) Appl. No.: 13/466,435

(22) Filed: May 8, 2012

(65) Prior Publication Data

US 2012/0290421 A1 Nov. 15, 2012

Related U.S. Application Data

(60) Provisional application No. 61/485,550, filed on May 12, 2011, provisional application No. 61/485,548, filed on May 12, 2011.

(51) Int. Cl.
*G06G 1/12* (2006.01)
*G06F 15/173* (2006.01)

(52) U.S. Cl.
USPC ............................................ 705/21; 709/226

(58) Field of Classification Search
USPC .......................................................... 705/21
See application file for complete search history.

(56) References Cited

U.S. PATENT DOCUMENTS

| | | | |
|---|---|---|---|
| 7,099,850 B1 | 8/2006 | Mann, II et al. | |
| 7,103,576 B2 | 9/2006 | Mann, III et al. | |
| 7,117,183 B2 * | 10/2006 | Blair et al. | 705/74 |
| 7,945,240 B1 | 5/2011 | Klock et al. | |
| 8,346,929 B1 * | 1/2013 | Lai | 709/226 |
| 2004/0230489 A1 | 11/2004 | Goldthwaite et al. | |
| 2006/0047572 A1 | 3/2006 | Moore et al. | |
| 2006/0265243 A1 | 11/2006 | Racho et al. | |
| 2009/0305673 A1 | 12/2009 | Mardikar | |

* cited by examiner

*Primary Examiner* — Garcia Ade
(74) *Attorney, Agent, or Firm* — MaxvalueIP LLC

(57) ABSTRACT

A mobile payment system authorizes payment by sending a Short Message Service (SMS) text message or secure hypertext transfer protocol (HTTPS) request to a customer's mobile phone or mobile device requiring customer to respond by SMS or HTTPS. A SMS payment software-plugin is installed on a Point-Of-Sale (POS) terminal. When a customer requests to pay by SMS, the plugin is activated and the customer's mobile phone number and zip code or POS PIN are entered on the POS terminal. The POS terminal sends a request to a SMS payment system, which sends the SMS text message to the customer's mobile device. When the customer replies to the SMS message with an approval code, the SMS payment system uses payment information for the customer to create a transaction request to a bank authorization network. When the SMS payment system receives authorization, it notifies the POS terminal to complete the purchase transaction.

7 Claims, 14 Drawing Sheets

| CASH REGISTER EXPRESS 3/19/2012 12:56 PM | | | □ X |
|---|---|---|---|
| SCAN BARCODE NOW | QTY | SEARCH | SUB TOTAL $45.95 |
| | | | TAX $3.22 — 104 |
| | | | GRAND TOTAL $49.17 |

| # | ITEM | QTY | PRICE |
|---|---|---|---|
| 1 | APP1@1PC/$10.00 | 1 | $10.00 |
| 2 | MEXFRY@1PC/$10.95 | 1 | $10.95 |
| 3 | PEPSI@1PC/$2.00 | 1 | $2.00 |
| 4 | LIQBLU@1PC/$5.50 | 1 | $5.50 |
| 5 | LIQ37@1PC/$8.00 | 1 | $8.00 |
| 6 | LIQ20@1PC/$6.00 | 1 | $6.00 |
| 7 | SLOGIN@1PC/$5.50 | 1 | $5.50 |

102

PAY

| VOID | HOLD | TS LU | OPT |
|---|---|---|---|
| CASH | CHECK | CREDIT | SMS PAY — 110 |

106

| DISC. | QTY CHANGE | PRICE CHANGE | FIND | | CUSTOMER INFO 100 101 - CASH CUSTOMER |

| DEL | | | | | |
|---|---|---|---|---|---|
| F1-HELP | F2-INV | F3-CLK IN | F4-CUST | F5-PR CK | F6-CASH |
| F7-CHECK | F8-CCARD | F9-ON ACCT | F10-CASHIER | | F12-OPT |

FIG. 5

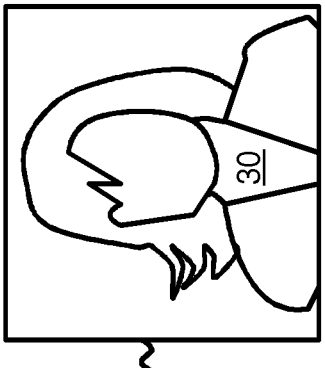

US 8,751,317 B2

ENABLING A MERCHANT'S STOREFRONT POS (POINT OF SALE) SYSTEM TO ACCEPT A PAYMENT TRANSACTION VERIFIED BY SMS MESSAGING WITH BUYER'S MOBILE PHONE

RELATED APPLICATIONS

This application claims the benefit of the U.S. provisional applications for "Enabling a Merchant's Storefront Point-of-Sale (POS) System to Accept a Payment Transaction Assisted by a Mobile Phone", U.S. Provisional Ser. No. 61/485,550, filed May 12, 2011, and "Multiple Payment Configuration", U.S. Provisional Ser. No. 61/485,548, filed May 12, 2011.

FIELD OF THE INVENTION

This invention relates to mobile payment systems, and more particularly to using standard mobile phones to enable payment at a merchant Point-Of-Sale (POS) system.

BACKGROUND OF THE INVENTION

Cashless payments such as by credit cards and debit cards are growing at a rapid pace. Mobile phones are also widely used. These two trends converge with mobile payments.

Mobile payments allow the user to pay for a purchase using a mobile device such as a smartphone. Many different mobile payment schemes have been proposed, and several are being tested. Success of these schemes has been limited for various reasons.

One problem with some mobile payment schemes is that they require a fairly sophisticated smartphone, such as an Android phone using Google software, or an iPhone using Apple software. Some mobile payment systems may support one brand of smartphones but not other brands. Since the smartphone market is currently split, mobile payment systems that support only Android or only Apple phones eliminate half or more of the potential cell-phone users.

The smartphone market is still fluid as new entrants such as Windows smartphones appear and have the potential, although perhaps not the likelihood, of taking away a major share of the market. WiFi-only devices that run Skype or similar calling programs may bypass traditional cellular networks yet still be used as mobile phones.

While smartphones have received a great deal of attention, many users still have older cell phones that do not run Android or Apple software. The high cost of smartphones limits their acceptance in cost-sensitive foreign markets and among cost-sensitive customers.

The fragmented mobile phone market limits the success of mobile payment systems that function with only a particular kind of smartphone, or that do not work with older legacy cell phones. The inventors believe that the widespread acceptance of a mobile payment system depends on it being able to operate with all kinds of mobile phones, including smart phones of all types, and legacy cell phones.

What is desired is a mobile payment system that operates with all kinds of mobile phones. A mobile payment system that enables a merchant's Point-Of-Sale (POS) system to accept a payment that is assisted by a user's mobile phone is desirable, regardless of the kind of mobile phone or mobile device. Enhanced verification of the user's identity is desirable using such a mobile payment system.

BRIEF DESCRIPTION OF THE DRAWINGS

FIG. 5 shows a screen on a POS terminal that is modified by an SMS payment plugin application.

FIGS. 6A-B show SMS payment screen.

DETAILED DESCRIPTION

The present invention relates to an improvement in mobile payments. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors realize that most mobile phones in use today support text messaging, such as using the Short Message Service (SMS). Thus SMS is a common denominator among most mobile phones.

The inventors also realize that the merchant's POS system may be enhanced to use SMS to verify and approve a payment using a traditional payment method, such as a credit card. The credit card information may be stored remotely, allowing the user to make payment to the merchant without showing the credit card to the merchant. Approval by the user is obtained using SMS text messages.

An SMS payment system can link to the merchant's POS system and to a bank or credit card authorization network. The SMS payment system communicates with the user/customer through SMS text messages to verify the payment to the merchant.

Figure 1:
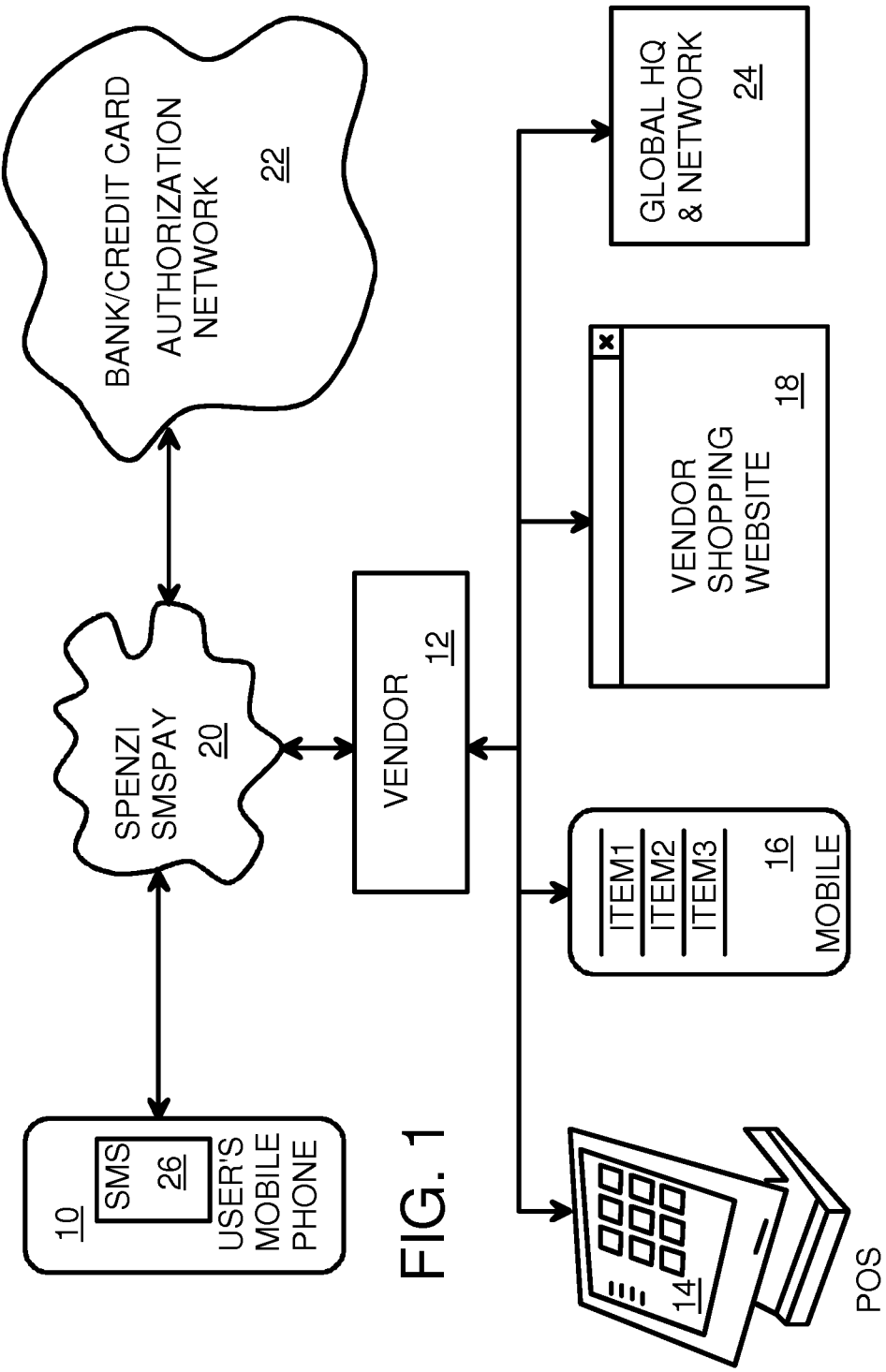
FIG. 1 shows a mobile payment system using SMS text messaging.

FIG. 1 shows a mobile payment system using SMS text messaging. Vendor 12 has several payment systems, such as POS terminals 14 in physical stores, mobile applications 16 that execute on customers' smartphones, vendor's shopping website 18 that customers can browse to, and vendor network 24 which includes other systems such as at a global headquarters, which may include a phone center that receives orders from customers. These act as POS endpoints.

SMS payment system 20 is a cloud-based service that sends and receives SMS text messages to user's mobile device 10, which includes SMS module 26 for receiving and sending SMS text messages over a cellular or other network.

SMS payment system 20 receives a request from vendor 12 when the customer carrying mobile device 10 initiates a purchase, such as at a checkout stand having a store clerk operating POS terminal 14. SMS payment system 20 sends a SMS message to mobile device 10, and the customer responds to with another SMS text message back to SMS payment system 20 to verify the purchase. Then SMS payment system 20 uses stored credit card or other payment information for this user to authorize payment to vendor 12 using bank authorization network 22.

SMS payment system 20 can operate with many different vendors, and with many different banks and credit card processors. Vendor 12 does not have to handle SMS messages with mobile devices, since these details are handled by SMS payment system 20.

Figure 2:
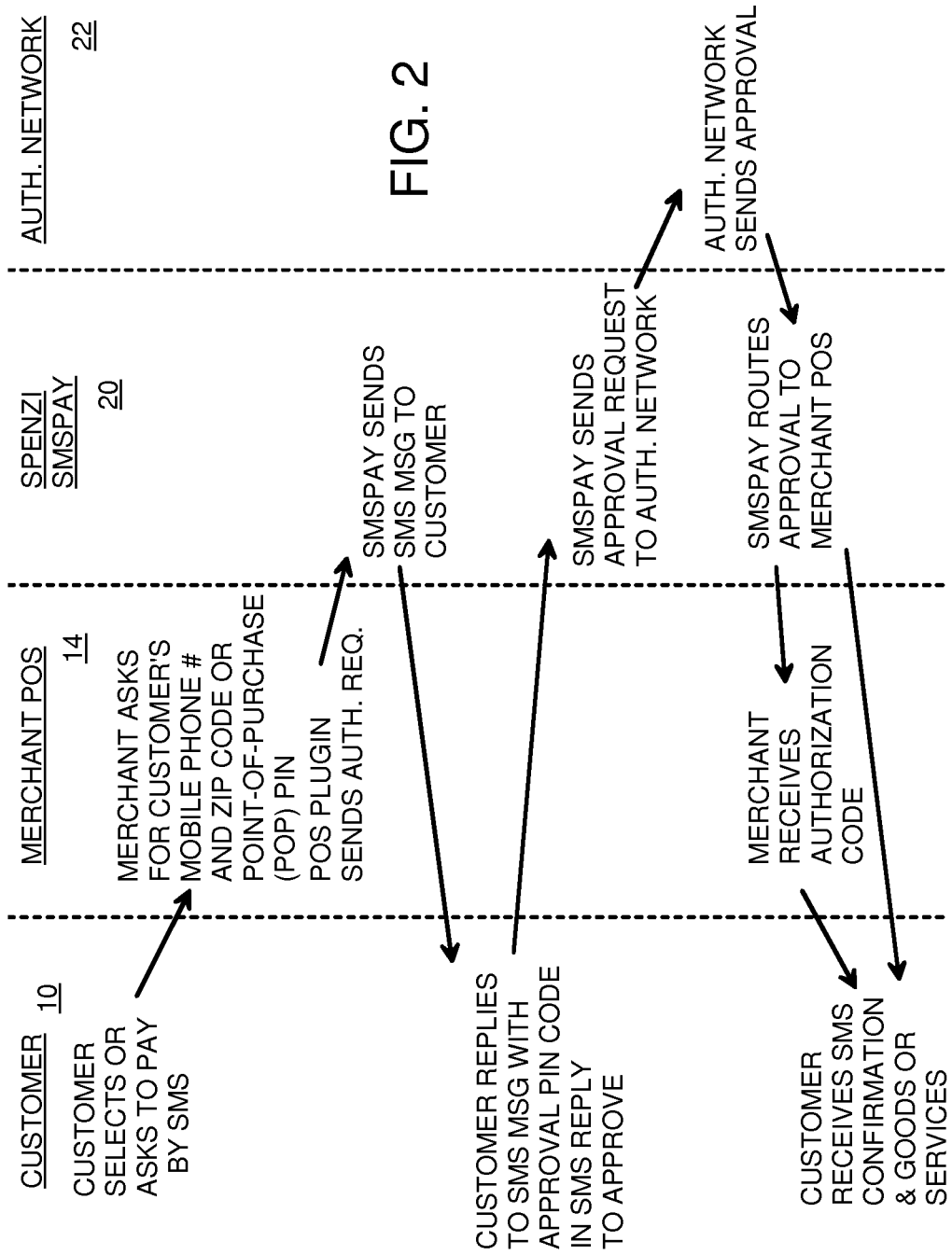
FIG. 2 is a transaction diagram showing steps in processing a mobile payment using SMS verification.

FIG. 2 is a transaction diagram showing steps in processing a mobile payment using SMS verification. The customer carries mobile device 10, such as a smartphone of any kind, or a legacy cell phone that supports SMS text messaging. The customer selects the merchandise to purchase and asks the store clerk to pay by SMS, or selects SMS by pressing a button on the payment pad by the cash register or checkout stand.

The merchant's clerk asks the customer for the customer's mobile phone number, and the customer's zip code. Rather than use the zip code, the customer may also use a POS Personal-Identification-Number (PIN) that the customer has previously selected. The customer may enter this information on the payment pad, or the store clerk may ask for it and enter it on the POS terminal.

The merchant's POS terminal 14 then sends this information to SMS payment system 20 using a POS plugin app that sends an authorization request to SMS payment system 20.

SMS payment system 20 receives the authorization request from POS terminal 14 and sends a SMS text message over the cellular network to the customer at the customer's mobile phone number. The customer receives the SMS text message, reads it, and replies to this SMS text message with an approval PIN code that the customer had previously selected. The reply SMS text message is sent over the cellular network from the customer's mobile device to SMS payment system 20. SMS payment system 20 verifies that the approval PIN is correct, and sends an authorization request to bank authorization network 22 with a request to pay the merchant.

The authorization request from SMS payment system 20 is processed by bank authorization network 22, causing a charge to be made to the credit card or other payment previously configured by the customer, with payment made to the vendor operating POS terminal 14. An approval message generated by bank authorization network 22 is sent back to SMS payment system 20, which routes the approval back to POS terminal 14 along with an authorization code.

SMS payment system 20 also sends another SMS text message to mobile device 10 to tell the customer that the purchase has been approved. The store clerk gives the merchandise to the customer once the approval is received by POS terminal 14 from SMS payment system 20.

Figure 3:
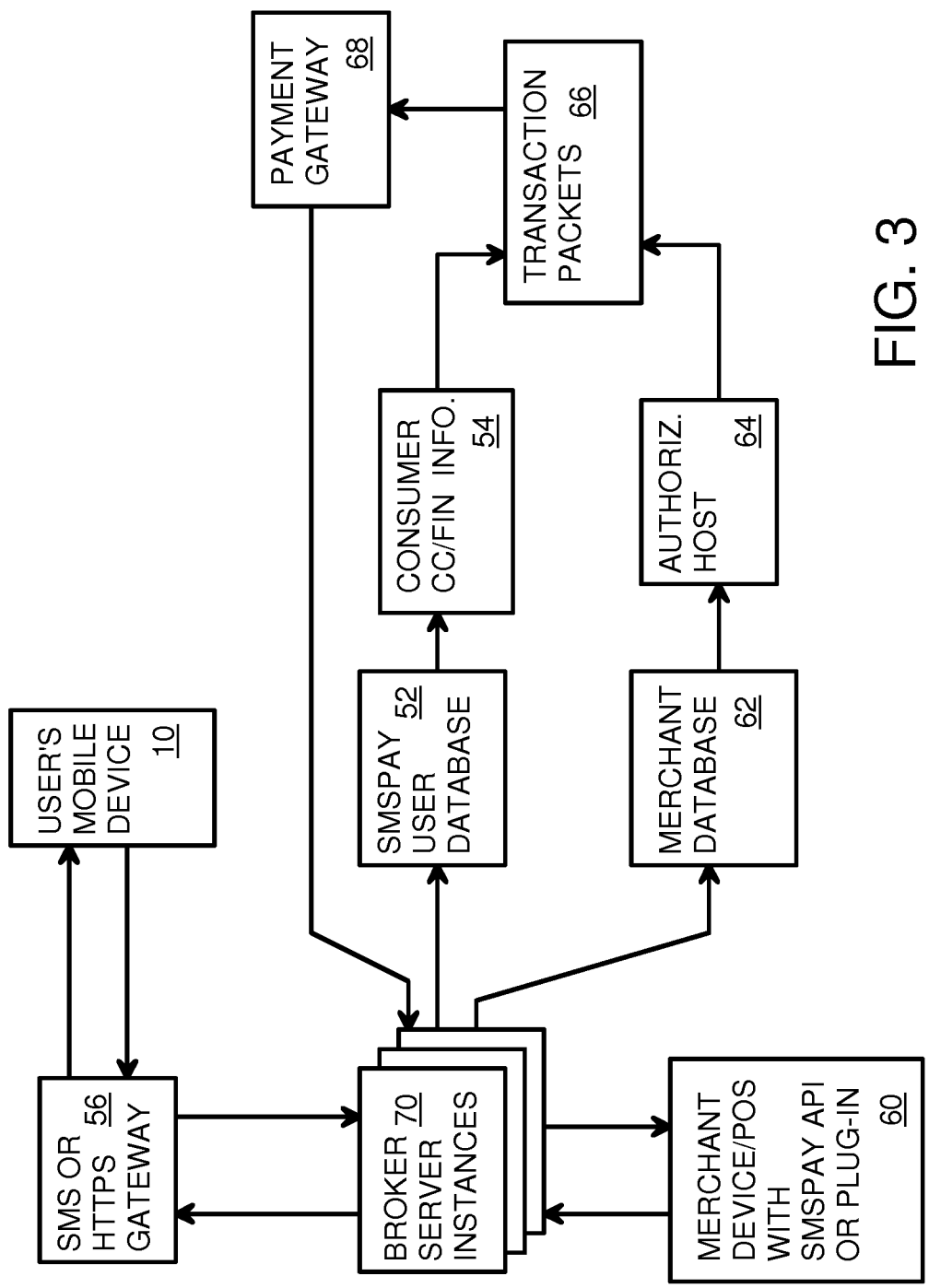
FIG. 3 is a block diagram of an SMS mobile payment system.

FIG. 3 is a block diagram of an SMS mobile payment system. A customer carrying mobile device 10, such as a mobile phone, has previously registered to use a SMS payment system. The customer's data is stored in SMS payment (SMSpay) user database 52, and includes an approval PIN that the customer selects, and a second piece of information, such as the customer's zip code, or another PIN, the POS PIN, that the user pre-selects. The customer also enters payment information, such as for a credit card, debit card, gift card, etc., which is stored in customer financial information database 54. The customer can enter payment, PIN, and other information at a web site for the SMS payment system, or using a mobile app that links to that website.

A SMS payment (SMSpay) plugin application or other code is installed on merchant POS terminals or merchant POS devices 60. The software on merchant POS devices 60 may be modified using instructions or commands that use an applications-programming interface (API) that connects to broker server instances 70 at SMS payment system 20 (FIG. 2), rather than installing a plugin app.

Broker server instances 70 are created on the servers at SMS payment system 20 to process payment requests from merchants. Broker server instances 70 parse the incoming requests from merchant POS devices 60 for the customer's mobile phone number, and lookup this phone number in SMSpay user database 52, and verify that the correct zip code or POS PIN is included in the requests. Broker server instances 70 then create a text message that is sent to mobile device 10 after being formatted as an SMS message by SMS gateway 56. When mobile device 10 is a smartphone configured properly, SMS gateway 56 may instead send the text message using a Secure Hyper-Text Transfer Protocol (HTTPS) connection that sends and receives Transport-Control-Protocol Internet Protocol (TCP/IP) packets with mobile device 10 over a cellular or other data network.

The reply SMS text message or HTTPS connection messages are received from mobile device 10 by SMS gateway 56 and passed on to the requesting one of broker server instances 70. The reply text message contains the approval PIN that the customer entered on mobile device 10. Broker server instances 70 match that approval PIN from mobile device 10 with a stored approval PIN in SMSpay user database 52 that the customer previously selected and stored.

Broker server instances 70 create transaction packets 66 once the customer's approval PIN is matched. The customer's payment information from customer financial information database 54 is combined with the merchant's information from merchant database 62 to form transaction packets 66. The merchant's information may include pre-configured settings for a payment gateway that are provided by authorization host 64, which may be a third-party payment processor, bank, or other financial or merchant institution. Broker server instances 70 may use the merchant's identifier from the request from merchant POS devices 60 to lookup merchant information in merchant database 62, and this merchant information is then sent to authorization host 64 and the reply data from authorization host 64 then merged into transaction packets 66 that are sent on to payment gateway 68.

Transaction packets 66, which consist of detailed financial information such as cardholder data and authentication data, stored in database 54, are sent to payment gateway 68. Payment gateway 68 processes the payment requests and responds with authorization codes and indicates that the transaction is completed, or with an error code.

Broker server instances 70 receive the authorization code from payment gateway 68 for the request, and send an approval message to merchant POS devices 60 and to mobile device 10 through SMS gateway 56.

Figure 4:
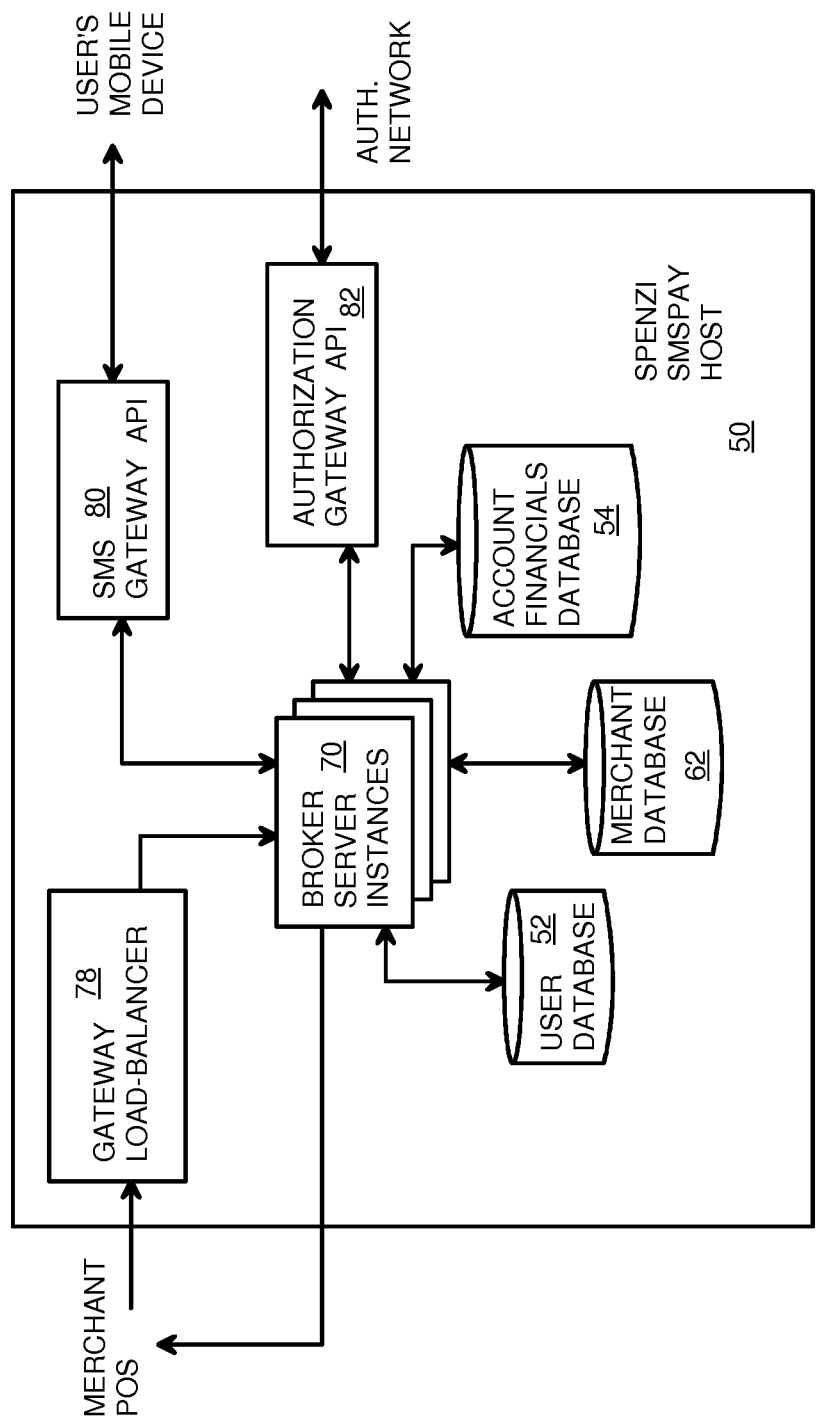
FIG. 4 is a diagram of a SMS payment system host.

FIG. 4 is a diagram of a SMS payment system host. SMS payment host 50 has SMSpay user database 52 that is populated with user records when a customer registers at a web site and enter his mobile phone number, mailing addresses, zip code (POS PIN), and approval PIN. Merchant database 62 is populated by merchant records for merchants that have installed SMS payment plugin apps or other code to accept payment through SMS payment host 50. Customer financial information database 54 contains the detailed financial information obtained when customers register, such as the credit card numbers, expiration dates, billing addresses, and verification codes. Additional levels of security such as encryption may be used to store data in customer financial information database 54 than with SMSpay user database 52.

Incoming requests from merchant POS terminals and other merchant devices are load-balanced by gateway load-balancer 78 and assigned to instances in broker server instances 70 for processing. Text messages to customer mobile phones and other mobile devices that are generated by broker server instances 70 are formatted as SMS messages using SMS gateway API 80. HTTPS connections may be used in place of SMS and issued and then received by broker server instances 70. SMS reply messages from customer mobile devices are returned using SMS gateway API 80 to broker server instances 70.

Payment request packets to the authorization networks or gateways are created by instructions executed by broker server instances 70 that use authorization gateway API 82. Different merchants may require that broker server instances 70 send requests to different authorization networks or payment processors who use different API's.

FIG. 5 shows a screen on a POS terminal that is modified by an SMS payment plugin application. Payment screen 100 is shown on POS terminal 14 (FIG. 2) for the store clerk to operate. Bar codes on items being purchased may be scanned and a list of items 102 displayed, along with a grand total 104. Payments by cash or check are made by pressing payment buttons 106. Credit cards may also be accepted by pressing the credit button.

An additional payment button is displayed for making payments by SMS. SMS pay button 110 is displayed alongside other payment buttons. The SMS payment plugin application modifies payment screen 100 to show SMS pay button 110.

Figure 6A:
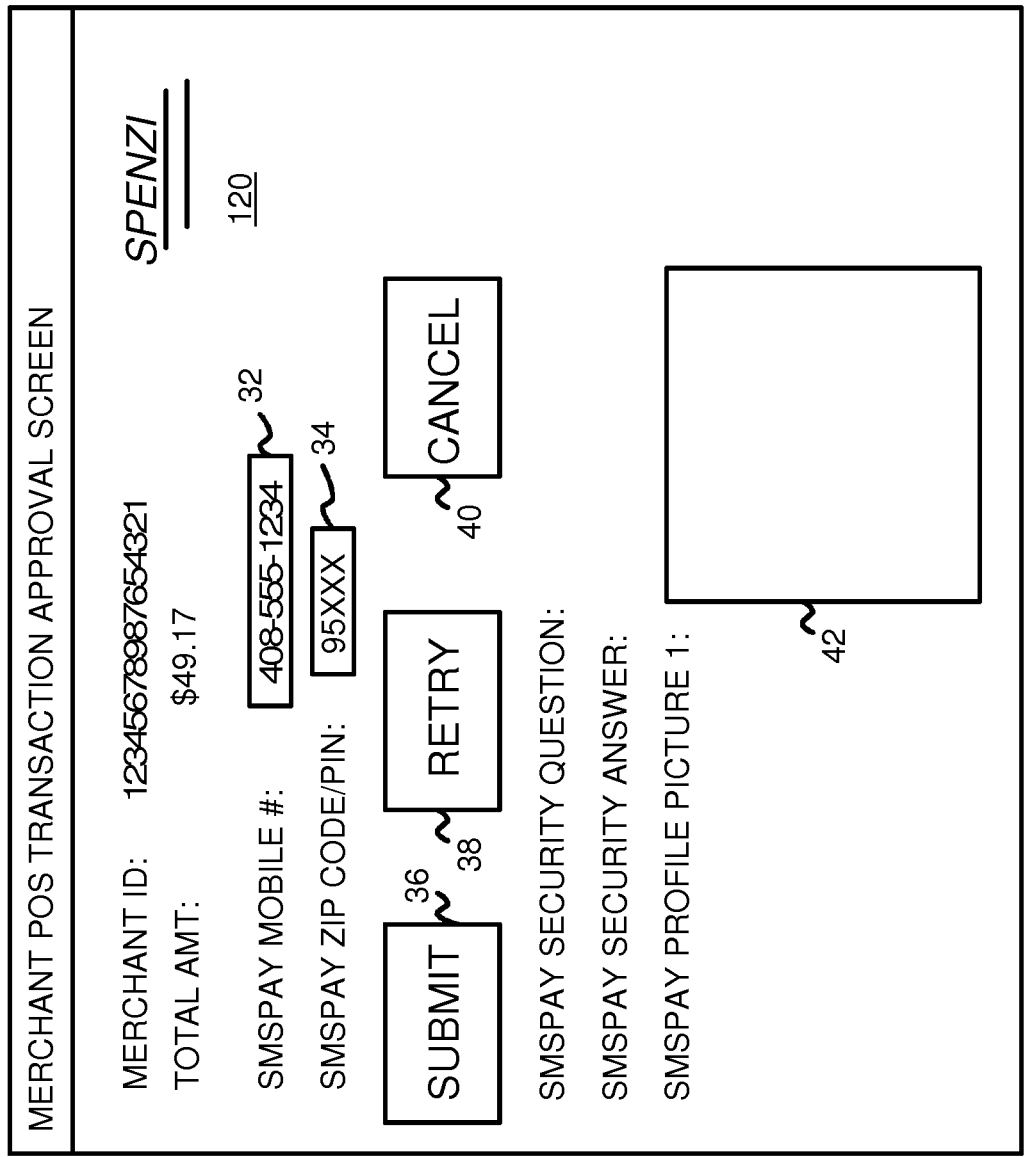

FIGS. 6A-B show an SMS payment screen. In FIG. 6A, when the store clerk presses SMS pay button 110 on payment screen 100 (FIG. 5), SMS payment screen 120 is displayed on POS terminal 14. The store clerk asks the customer for his or her mobile phone number, which the store clerk types into phone field 32. The store clerk also asks for the customer's zip code or POS PIN, which the store clerk types into zip code field 34. When the store clerk presses submit key 36, a request is sent to SMS payment system 20. The store clerk may also cancel the payment using cancel key 40 or retry using retry key 38.

In FIG. 6B, SMS payment system 20 may display a security question and answer at SMS payment screen 120 for the store clerk to ask the customer. Profile picture 30 of the customer may also be displayed in frame 42 for the store clerk to verify the customer. This information may be displayed while SMS payment system 20 is sending the SMS text message to the customer while the store clerk is waiting for approval.

Figure 7A:
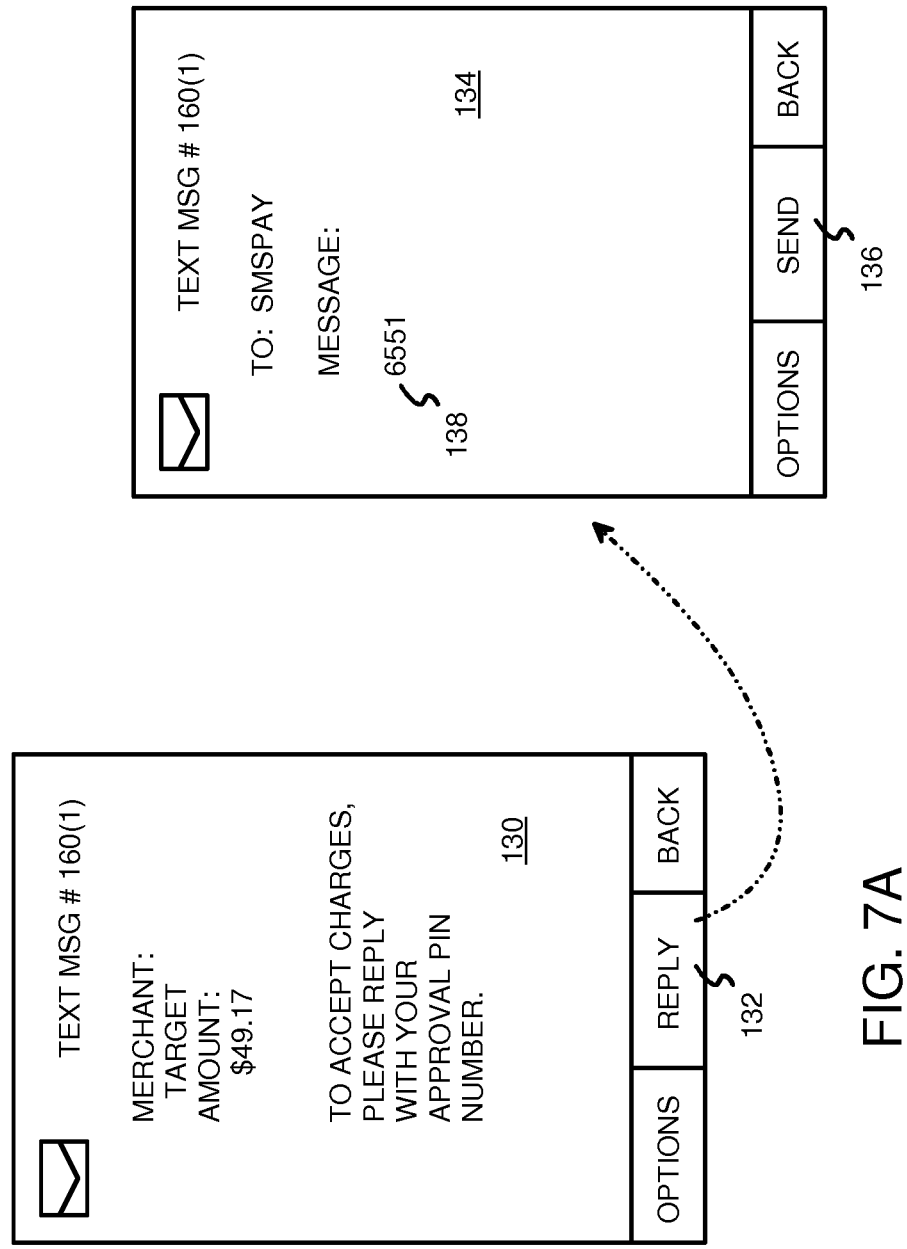
FIGS. 7A-B show SMS text messages being exchanged with the customer's mobile phone.
Figure 7B:
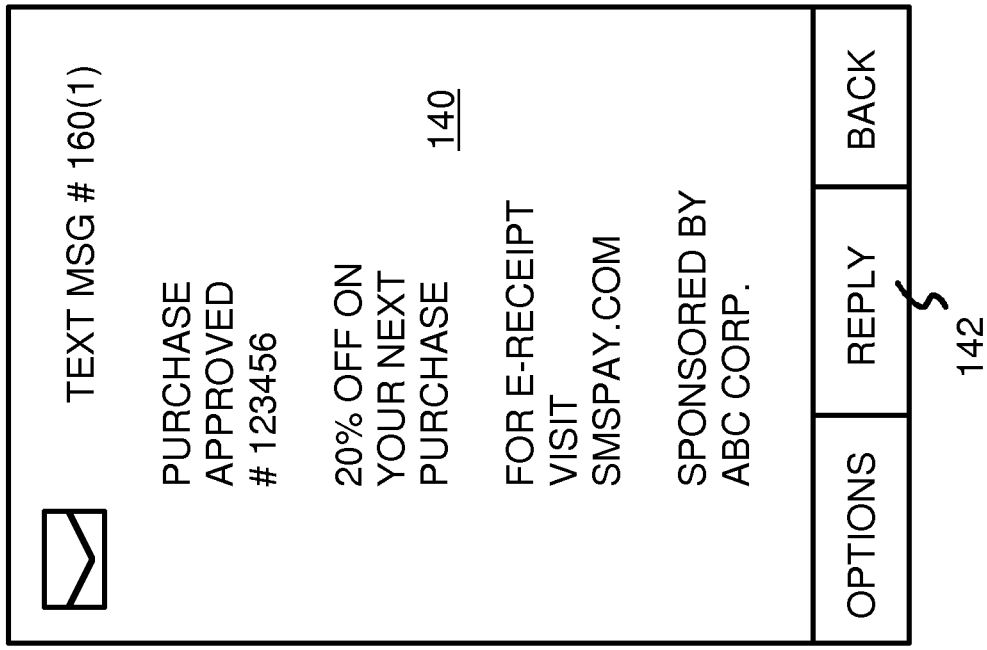

FIGS. 7A-B show SMS text messages being exchanged with the customer's mobile phone. In FIG. 7A, SMS text message 130 is sent from SMS payment system 20 to the customer's mobile device 10 and displayed on the phone's display to the customer.

The text message shows the amount, merchant's name, and a message to reply with the approval PIN to accept the charge. The customer then presses reply button 132 on mobile device 10 and types in approval PIN 138. The customer's approval PIN 138 is entered as "6551" by the customer typing in these 4 digits using a key pad on mobile device 10. The key pad may be an alphanumeric keyboard that is displayed on the display screen of mobile device 10, or may be physical telephone number keys on mobile device 10. Then the customer presses send button 136 to send reply SMS text message 134 back to SMS payment system 20.

In FIG. 7B, the approval PIN from the customer is matched to the customer's record by SMS payment system 20 for approval, and then one or more transaction packets are sent to the bank authorization network to obtain an approval code. SMS payment system 20 sends another SMS text message to the customer's mobile device 10. Approved message 140 indicates that the purchase was approved. Other information may be included in approved message 140, such as an advertisement, or a discount code or other information for a future sale. Reply button 142 may be used in some embodiments for the customer to obtain the future discount, or to get more information.

Figure 8:
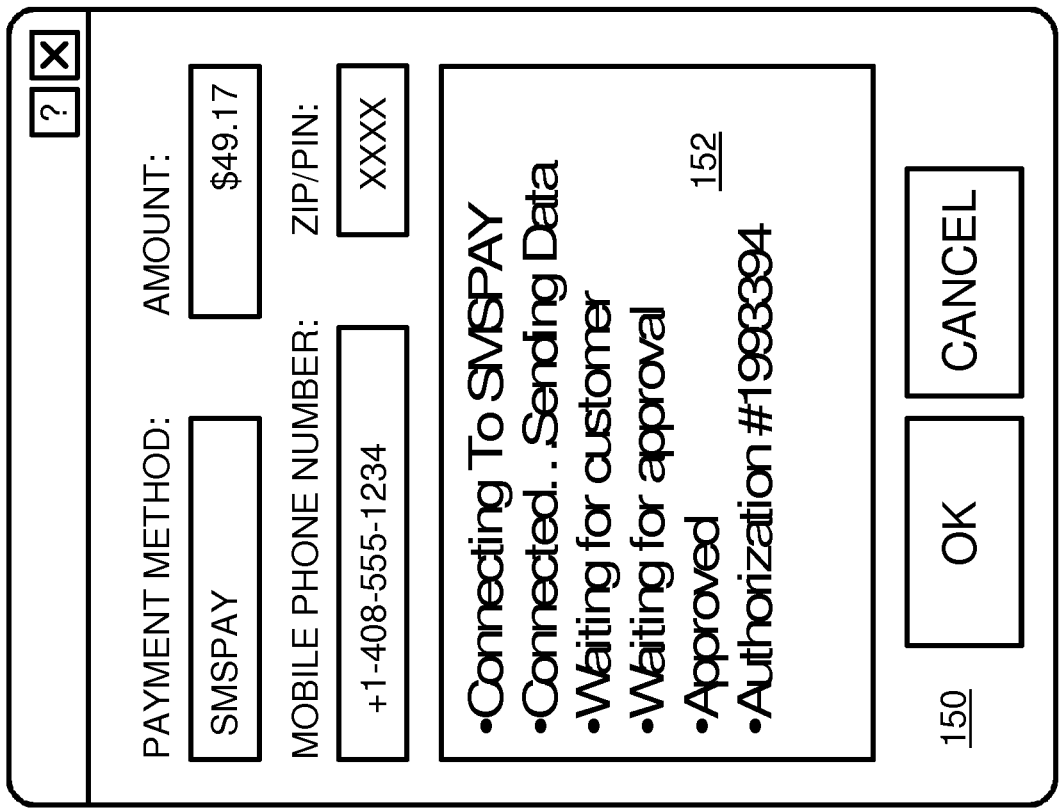
FIG. 8 shows an authorizing screen displayed to the store clerk on POS terminal 14.

FIG. 8 shows an authorizing screen displayed to the store clerk on POS terminal 14. After the store clerk presses submit key 36, authorizing screen 150 is displayed on POS terminal 14. The customer's mobile phone number, purchase amount, and a payment method of "SMSpay" are displayed.

Status message window 152 displays intermediate messages as the authorization process occurs. The merchant POS device first connects to SMS payment system 20 and then sends the request information, such as the customer's mobile phone number and a merchant ID. Once the customer replies to the SMS text message with approval PIN 138, the status changes from "Waiting for customer" to "Waiting for approval". Once the bank authorization network approves the purchase transaction, "Approved" is displayed, followed by the authorization code. The store clerk then presses the OK button to complete the sale. Transaction details may be passed to the merchant's local POS hardware and database. A register receipt may be printed by POS terminal 14 and given to the customer. Payment screen 100 (FIG. 5) is cleared and displayed on POS terminal 14 for the next customer.

Figure 9:
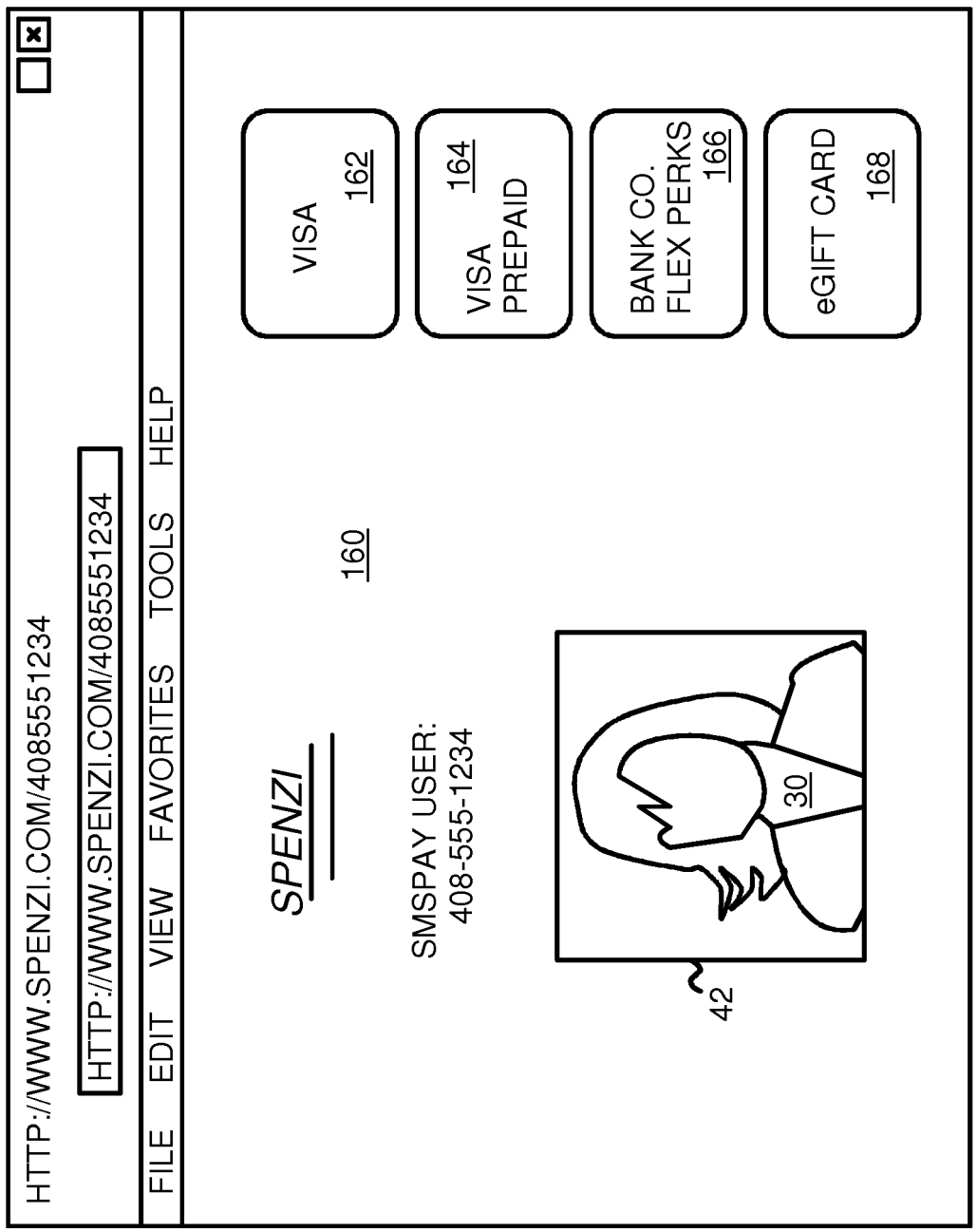
FIG. 9 shows a home account screen displayed to the customer for configuring the customer's account at SMS payment system 20.

FIG. 9 shows a home account screen displayed to the customer for configuring the customer's account at SMS payment system 20. The customer uses an internet browser, such as on a personal computer (PC), tablet, or on mobile device 10, and enters the hyper-text transfer protocol (HTTP) web address of the SMS payment system, or uses a web search or other means to browse to the SMS payment web site. The customer may register as a new user and enter requested data such as the customer's mobile phone number, or may logon to an existing account using the customer's mobile phone number as the account name.

Home account screen 160 is displayed on the customer's browser. The customer's mobile phone number is entered and displayed, along with profile picture 30 in frame 42. The customer may upload a photo for use as profile picture 30.

The customer may configure various payment options using menus or other buttons displayed on the web site. Each payment option is displayed as card icons on the right in this embodiment. The customer may press any of these payment icons to add or change financial information, such as credit card numbers, expiration dates, mailing addresses and names as shown on the cards. Payment options may include Visa credit card 162, prepaid card 164, reward account card 166, and gift card 168. Multiple cards of each type may be configured, such as multiple credit cards from different banks or card suppliers. Stacks of cards may be displayed when many cards are configured.

Figure 10:
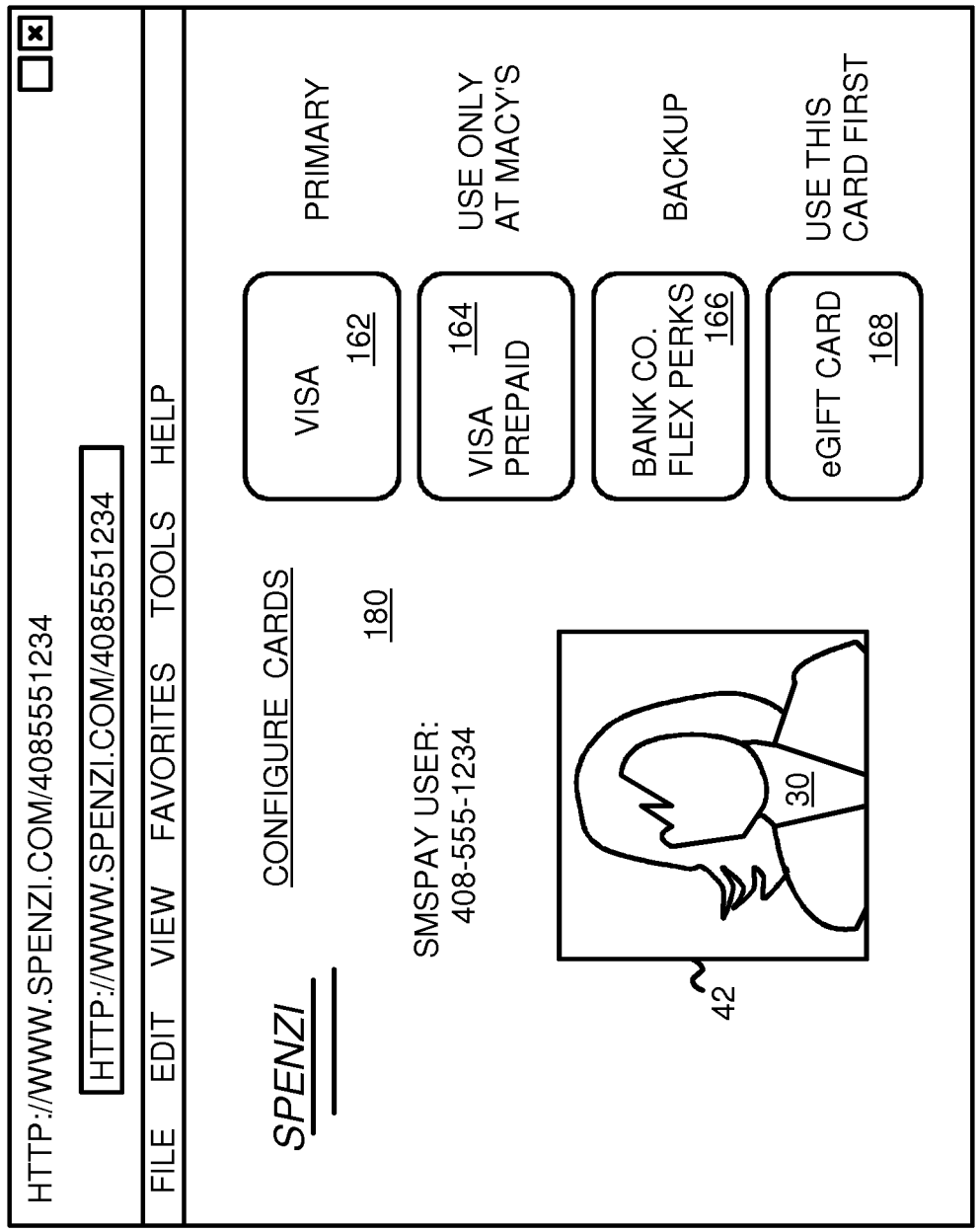
FIG. 10 shows a customer configuring card options.

FIG. 10 shows a customer configuring card options. The customer may press a menu or other button (not shown) on home account screen 160 (FIG. 9) to display configure card screen 180. The customer has set Visa credit card 162 as the primary payment source that is selected automatically at most merchants. Prepaid card 164 is configured to be used at one particular merchant instead of Visa credit card 162. Reward account card 166 is selected as a backup in case Visa credit card 162 is declined. Gift card 168 is configured to be used first, before primary Visa credit card 162, until the amount on gift card 168 is depleted. Additional screens or pop-ups may be displayed to the customer to enter configuration information or to make selections.

Figure 11:
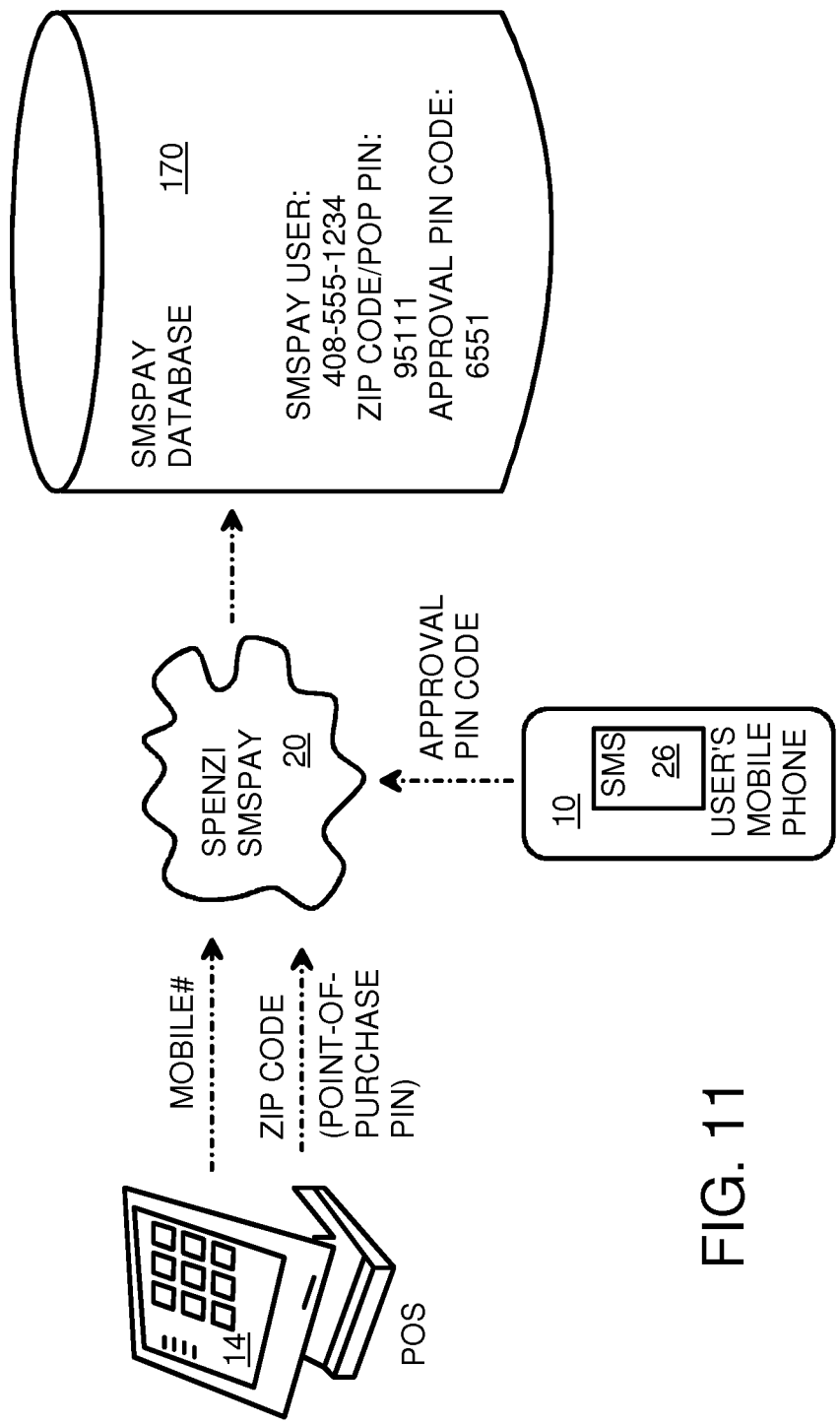
FIG. 11 highlights dual-factor authorization.

FIG. 11 highlights dual factor authorization. Security may be enhanced relative to traditional payment methods such as credit and debit cards since the customer must be in physical possession of his or her mobile phone to pay by SMS.

The customer must supply his mobile phone number and zip code (or POS PIN) at the point of purchase, and enter this information into POS terminal 14 to begin the transaction. SMS payment system 20 then sends an SMS message to that mobile phone number. Most mobile devices have a unique identifier such as an International Mobile Equipment Identity (IMEI) number, which is a 15-digit serial number, and/or an International Mobile Subscriber Identity (IMSI), which is a 64-bit field store on the Subscriber Identity Module (SIM) card inside the mobile device. Mobile device 10 must use these unique identifiers to make a call over a cellular network. An encryption key may be used that is related to these unique identifiers. When a mobile phone is lost or stolen, these numbers may be placed on a black list to prevent their use. Thus mobile device 10 contains security features that are intended to quickly deactivate stolen phones.

SMS payment system 20 may be configured to only send SMS text messages to valid phone numbers. SMS module 26 is an SMS application that sends SMS text messages over the cellular network, and excludes third party software such as text-messaging applications that execute on smartphones and PC's. These third-party applications are excluded since they allow the user to create an email address to receive text messages, and these email addresses are not necessarily the customer's mobile phone number. Thus SMS module 26 uses the customer's mobile phone number to receive SMS messages. Some smartphones may allow text messaging or other messaging by several methods, such as over a WiFi/cellular data network (Google Voice). These programs may include SMS module 26 that sends standard SMS text messages over the cellular network as a sub-set of their features. SMS payment system 20 only communicates using standard SMS text messaging, or using a secure HTTPS connection that can be validated with the customer's mobile phone number, such as an HTTPS connection that can only operate on mobile device 10, not on PC's or other devices.

SMS payment system 20 only sends text messages to mobile device 10 when mobile device 10 has not been deactivated or blacklisted by the cellular carrier. SMS payment system 20 inherently verifies the customer's mobile phone number since only that unique mobile device 10 can receive those SMS text messages, or receive an HTTPS connection from SMS payment system 20. The reply SMS text message with the approval PIN must have been sent from mobile device 10, operating with an IMSI, IMEI, or other device identifiers.

The approval PIN from mobile device 10 must match the stored approval PIN for that customer's record in SMS payment database 170. The customer's mobile phone number is used to lookup the record in database 170, while the zip code from POS terminal 14 and the approval PIN from mobile device 10 must match the stored values in database 170.

There are two factors of authentication required, in addition to the customer's phone number. The correct zip code (or POS PIN) must be entered at POS terminal 14, and the correct approval PIN must be sent as a SMS text message from mobile device 10.

Figure 12:
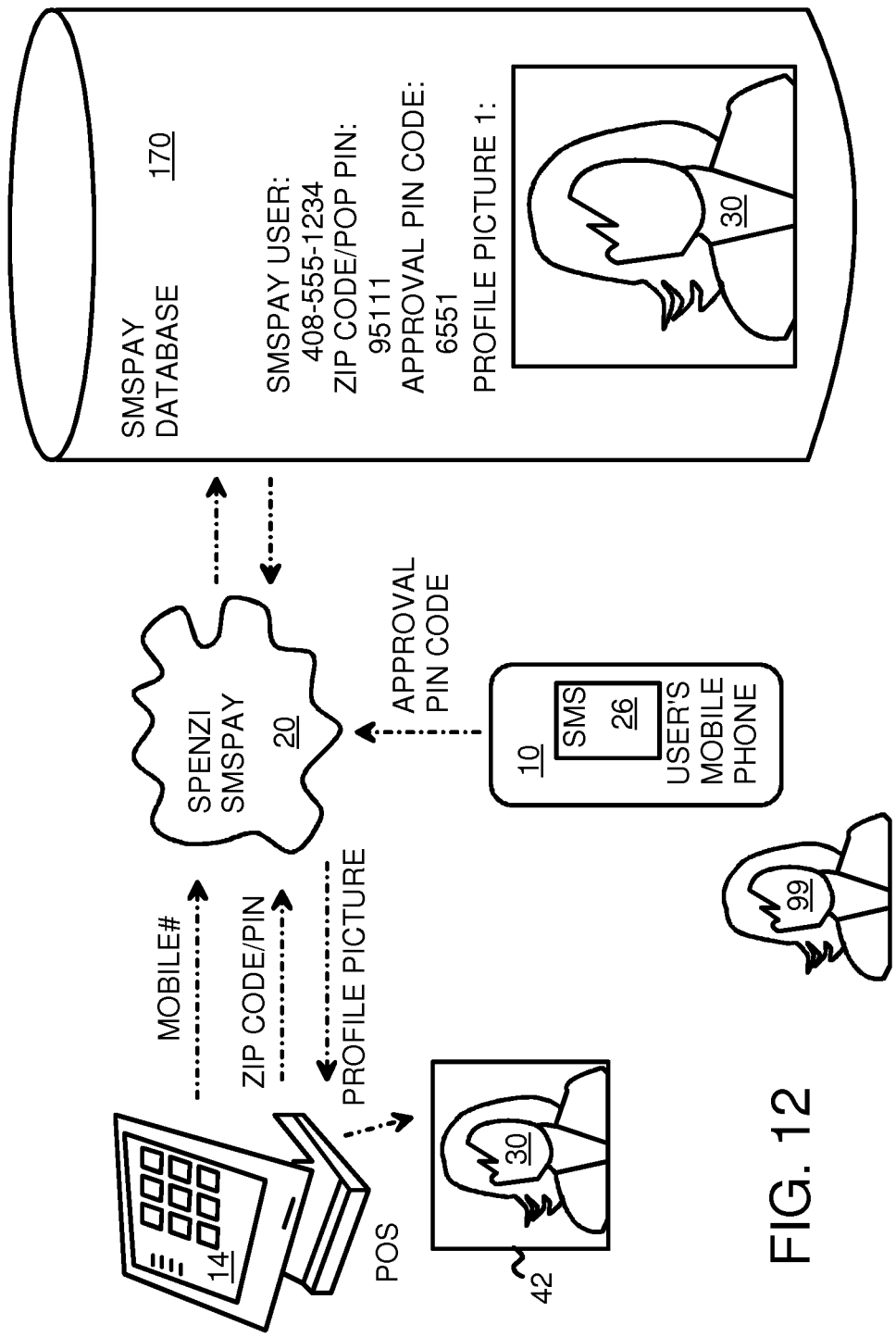
FIG. 12 highlights enhanced dual-factor authorization.

FIG. 12 highlights enhanced dual factor authorization. In addition to the two factors described for FIG. 11, database 170 also stores profile picture 30. SMS payment system 20 sends profile picture 30 to POS terminal 14 while waiting for authorization and displays profile picture 30 in frame 42 at POS terminal 14 to the store clerk. The store clerk may visually compare customer 99 to profile picture 30 and detect when an imposter is attempting to make a fraudulent purchase.

Profile picture 30 acts as an additional factor when customer 99 is physically present in a store and a store clerk is able to see customer 99.

Alternate Embodiments

Several other embodiments are contemplated by the inventors. For example, many variations of display screen 100 of POS terminal 14 are possible, and for other displays and web pages and messages shown in the drawings. While SMS payment system 20 using SMS text messaging has been described, SMS payment system 20 may use HTTPS or Hyper-Text-Markup-Language version 5 (HTML5) or later when connecting to some advanced smartphones or other mobile device 10. SMS payment system 20 may have the ability to use SMS for older mobile phones, and more advanced and secure connections that feature handshaking and packet exchange with more advanced mobile devices. Encryption keys may also be exchanged in some of these advanced connection methods.

While POS terminal 14 has been described as being operated by a store clerk or employee, some POS terminals 14 may be self-server and operated by the customer. Other POS terminals 14 may have the customer enter information on a small keypad so that the store clerk does not see this information, such as a POS PIN. POS terminal 14 could also be located at a call center where the customer is not physically present, or be part of an online store, such as part of a checkout shopping program. POS terminals traditionally have a drawer for accepting cash, and are a replacement for a cash register.

POS terminal 14 could be on a mobile device such as a tablet, mobile phone, or other mobile device. POS terminal 14 could be a game console, a smart refrigerator or other smart appliance, a gasoline pump, a smart TV, a set-top box, a GPS device, a WiFi router, a tablet, a laptop, a camera, any video-based interface system, an audio system with some interface to purchase, any Internet device with a screen, or any connected device with a remote web interface/software interface. The generic term POS endpoint is intended to include POS terminals 14, whether traditional stationary cash registers, mobile tablets or other devices that a store clerk carries around a store, mobile applications that execute on customers' smartphones, vendor's shopping websites that customers can browse to, and the vendor network which includes other systems such as at a global headquarters, which may include a phone center that receives orders from customers.

While the customer either verbally telling the sales clerk or manually typing in the customer's mobile phone number and zip code or POS PIN has been described, voice recognition software could be used to capture the information. A random or other security question could be asked of the customer, either in place of the zip code or in addition to the zip code. Some embodiments may rely on only the mobile phone number, not a zip code or second piece of information from the customer. Some advanced smartphones may be detectable by POS terminal 14, such as over a wireless network, and this could be an additional factor for verification. The SMS payment system could be used in combination with other security and payment systems.

If the zip code or POS PIN does not match, SMS payment system 20 could initiate a voice call to mobile device 10 and have an operator or a computerized system ask the customer for additional or backup verification. This additional verification could also be sent by SMS text messaging, email, or other methods. These phone calls could be recorded.

If verification fails, the purchase is blocked. The customer could be notified by other means that does not rely on the physical possession of mobile device 10, such as email, a call to a home phone or to a friend's phone, and/or mail. A security group at SMS payment system 20 or a bank or credit card company could also be notified, as could the cellular carrier. An SMS message indicating that the purchase has been declined may also be sent, either when the approval PIN is not matched, or bank authorization network 22 fails to authorize the charge, such as for insufficient credit or funds. Various steps may be repeated for a fixed number of times, such sending the SMS message again if the customer mistakenly types in the wrong approval PIN.

While the customer replying to the SMS text message with her approval PIN has been described, the customer could also be asked to answer a multiple-choice security question, enter some other piece of information, or even reply with a random code that is part of the SMS text message. For example the SMS text message could say "reply with code 5251". The customer then replies with a text message saying "5251".

SMS payment system 20 has the merchant install a plugin application on POS terminal 14 or otherwise modify its software. However, the customer does not have to install any software on mobile device 10. The customer only has to link his mobile phone number to his payment method and provide verification information. The customer may do this by logging on to the web site for SMS payment system 20, or its parent company, or a business partner's web site that provides this linking. The customer could call in to a call center to register and link his phone number and provide payment and verification information over the phone, or even in person at a store, such as at POS terminal 14. The customer could also use a smartphone application that uses HTTP5 or HTTPS to register for, configure, and monitor use of SMS payment.

Payment sources could include credit cards, debit cards, gift cards, checking accounts or other bank or brokerage accounts, various merchant programs such as reward points programs or loyalty programs, or any other money or quasi-money source. The user may define nicknames for payment sources and configure rules for selecting payment methods, such as to use a particular card at a particular merchant, default cards, backup cards, etc. The SMS payment configuration web site could provide a list of all merchants accepting SMS payments, allowing the customer to configure various cards or payment sources for various merchants. Some merchants may offer discounts or other incentives, or display advertising to the customer on the SMS payment web site. Various menus or dialog boxes may be used to assist the customer in configuring payment sources and rules.

Registered customers may suspend payments by SMS payment system 20. The customer could telephone a call center for SMS payment system 20 to request suspension of a particular transaction, or to suspend all transactions, such as if mobile device 10 is lost. The customer could also suspend transactions by logging on to the SMS payment system website and selecting a suspend transaction feature. In some embodiments the customer may be able to suspend transactions at POS terminal 14 by telling the store clerk, who uses the SMS payment plugin application to suspend the customer's SMS pay account. The customer could also send a specific trigger code by SMS to SMS payment system 20 that causes the account to be frozen immediately.

While SMS payment system 20 creating transaction packets of a request to bank authorization network 22 have been described, SMS payment system 20 could notify the merchant of authorization by SMS, send the customer's payment information, and then allow the merchant to directly process the transaction with bank authorization network 22. Several variations of authorization are possible. The merchant may handle authorization with the bank or financial network, and merely use the SMS payment system to exchange SMS text messages with the customer for verification, with the customer still providing a copy of his credit card to the merchant. In this variation, the SMS payment system is simply an additional verification method. Alternately, the SMS payment system could send the customer's payment information to the merchant rather than to the authorization network, or could provide this information to a third party who then combines the customer's payment information with information from the merchant before sending the authorization request to the authorization network. The authorization network itself may be quite complex with several intermediate steps and processes.

A customer could be a retail shopper, and online shopper, a wholesale purchaser, a program or application user, or other purchaser of goods, services, or software. The customer's phone number and zip code or POS PIN could be encrypted for transmission from POS terminal 14 to SMS payment system 20. Other messages could also be encrypted, partitioned, scrambled, or otherwise modified. SMS payment system 20 could further verify that the SMS reply message is from the customer's mobile device 10 by matching the user's mobile phone number in the reply SMS message, or by matching text copied in the reply SMS message from the original SMS text message sent to the customer.

Rather than store a single profile picture 30, additional history of pictures may be stored. These additional pictures may be references with previous pictures for further security steps, such as to prevent a completely different person from using the account, since pictures of the original account owner are retained. Profile pictures may be linked to POS PIN(s) for multi-use cases such as allowing additional authorized users on the account, such as for Family, Corporate, or Group accounts.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A mobile-payment authorizing system comprising:
   a user database having user records for customers, wherein a user record for a customer comprises a mobile device number that uniquely identifies the customer's mobile device, and a payment record locator for locating payment information for the customer;
   a merchant gateway for receiving merchant requests from Point-Of-Sale endpoints at a merchant,
   wherein the merchant requests include the mobile device number for the customer that the customer provides to the merchant, and an amount of a purchase by the customer;
   a mobile messaging gateway,
   wherein said mobile messaging gateway sends a first mobile message to the customer's mobile device over a mobile network using the mobile device number that uniquely identifies the customer's mobile device,
   wherein said mobile messaging gateway receives a second mobile message from the customer's mobile device in response to the first mobile message;
   an authorization gateway,
   wherein said authorization gateway sends an authorization request to a financial authorization network when the second mobile message is received and verified,
   wherein the authorization request includes an identifier of the merchant and the payment information located for the customer using the payment record locator,
   wherein the authorization gateway receives a completed message from the financial authorization network, when payment is authorized;
   a plurality of broker server instances,
   wherein each broker server instance among said plurality of broker server instances processes a transaction,
   wherein said each broker server instance receives a merchant request from a point-of-sale endpoint,
   wherein said each broker server instance extracts an extracted mobile device number from the merchant request,
   wherein said each broker server instance uses the mobile device number to locate a matching customer record in the user database,
   wherein said each broker server instance activates the mobile messaging gateway to send the first mobile message to the extracted mobile device number,
   wherein said each broker server instance verifies the second mobile message, activating the authorization gateway to send the authorization request,
   wherein said each broker server instance activates the merchant gateway to send a complete transaction message to the point-of-sale endpoint in response to the completed message,
   wherein transactions are processed by verifying the second mobile message received from the customer's mobile device in reply to the first mobile message;
   wherein the user record in the user database further comprises an approval personal-identification-number known by the customer;
   wherein the second mobile message further comprises the approval personal-identification-number entered by the customer on the customer's mobile device;
   an approval personal-identification-number verifier,
   wherein said approval personal-identification-number verifier matches the approval personal-identification-number from the second mobile message with the approval personal-identification-number stored in the user record in the user database,
   wherein the customer approves the transaction by inserting the approval personal-identification-number into the second mobile message;
   wherein the first mobile message comprises a short message service text message sent to customer's mobile device using the mobile device number read from the user record in the user database;
   wherein the second mobile message comprises a short message service text message that the customer sends in reply to the first mobile message,
   wherein the second mobile message comprises the approval personal-identification-number entered by the customer on the customer's mobile device.

2. The mobile-payment authorizing system of claim 1 wherein the first mobile message and the second mobile message are sent over a secure hyper-text transfer protocol connection or using a Hyper-Text-Markup-Language connection.

3. The mobile-payment authorizing system of claim 1 wherein the merchant request further comprises a zip code of the customer's home address or a point-of-sale personal-identification-number selected by the customer;
   wherein the user record further comprises the zip code of the customer's address home or the point-of-sale personal-identification-number selected by the customer;
   further comprising:
   a second factor verifier for matching the zip code or point-of-sale personal-identification-number from the merchant request with the zip code or point-of-sale personal-identification-number stored in the user record in the user database,
   whereby the customer provides the zip code or point-of-sale personal-identification-number to the point-of-sale endpoint.

4. The mobile-payment authorizing system of claim 3 further comprising:
   a mobile-payment plugin application, loaded into the point-of-sale endpoints, activated when the customer requests mobile payment, for receiving the customer's mobile number and zip code or point-of-sale personal-identification-number, and for generating the merchant request sent to the merchant gateway and for completing a transaction when the complete transaction message is received;
   wherein the point-of-sale endpoints comprise point-of-sale terminals that have a drawer for accepting cash,
   whereby mobile-payment plugins are loaded into the point-of-sale endpoints.

5. The mobile-payment authorizing system of claim 1 wherein the user record further comprises a profile picture showing an image of the customer's face;
    wherein the merchant gateway sends the profile picture to the point-of-sale endpoint for display on the point-of-sale endpoint while the merchant request is being processed, whereby the image of the customer's face is displayed on the point-of-sale endpoint.

6. The mobile-payment authorizing system of claim 1 wherein the customer's mobile device number is an index into the user database;
    wherein the user records in the user database are looked up using the customer's mobile device number.

7. The mobile-payment authorizing system of claim 6 wherein the customer's mobile device number is a telephone number for making voice calls over a cellular network to the customer's mobile device.

\* \* \* \* \*